(12) United States Patent
Gady et al.

(10) Patent No.: US 6,644,428 B2
(45) Date of Patent: Nov. 11, 2003

(54) AUTOMATIC AXLE TRACTION CONTROL

(75) Inventors: Richard E. Gady, Rochester Hills, MI (US); Stephen A. Federighe, Washington, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 20 days.

(21) Appl. No.: 09/873,440

(22) Filed: Jun. 4, 2001

(65) Prior Publication Data

US 2002/0179357 A1 Dec. 5, 2002

(51) Int. Cl.⁷ .............................................. B60K 17/356
(52) U.S. Cl. ...................... 180/197; 180/244; 180/248
(58) Field of Search ................................ 180/244, 247, 180/248, 249, 197; 701/89

(56) References Cited

U.S. PATENT DOCUMENTS

| | | | |
|---|---|---|---|
| 4,753,312 A | * 6/1988 | Burgdorf et al. | 180/244 |
| 4,854,413 A | 8/1989 | Kameda | |
| 4,967,869 A | * 11/1990 | Nagaoka et al. | 180/244 |
| 5,035,158 A | 7/1991 | Leigh-Monstevens | |
| 5,150,637 A | 9/1992 | Ninomiya | |
| 5,184,695 A | * 2/1993 | Matsuda et al. | 180/244 |
| 5,215,160 A | 6/1993 | Williams | |
| 5,275,252 A | 1/1994 | Sperduti | |
| 5,275,253 A | 1/1994 | Sperduti | |
| 5,335,764 A | 8/1994 | Leitner et al. | |
| 5,407,024 A | 4/1995 | Watson | |
| 5,485,894 A | 1/1996 | Watson | |
| 5,522,777 A | 6/1996 | Baxter | |
| 5,609,219 A | 3/1997 | Watson | |
| 5,651,593 A | * 7/1997 | Shitani et al. | 180/244 |
| 5,737,714 A | * 4/1998 | Matsuno et al. | 180/197 |
| 5,771,477 A | 6/1998 | Showalter | |
| 5,850,616 A | 12/1998 | Matsuno | |
| 5,867,092 A | 2/1999 | Vogt | |
| 5,913,377 A | 6/1999 | Ota | |
| 5,927,426 A | 7/1999 | Hall | |
| 5,993,354 A | 11/1999 | Winks | |
| 6,000,488 A | 12/1999 | Atkinson | |
| 6,007,454 A | * 12/1999 | Takahira et al. | 180/197 |
| 6,062,330 A | 5/2000 | Watson | |
| 6,105,703 A | * 8/2000 | Kuroda et al. | 180/248 |
| 6,108,601 A | 8/2000 | Breithor et al. | |
| 6,115,663 A | * 9/2000 | Yasuda | 180/197 |

(List continued on next page.)

FOREIGN PATENT DOCUMENTS

| | | |
|---|---|---|
| DE | 3527959 | 2/1987 |
| DE | 3636260 | 5/1988 |
| EP | 0 510 457 | 8/1994 |
| EP | 0 885 766 | 8/2000 |

OTHER PUBLICATIONS

The 43rd L. Ray Buckendale Lecture, "Commercial Vehicle Braking Systems: Air Brakes, ABS and Beyond", Leonard C. Buckman, P.E.—Meritor WABCO, SAE International, 1998.

Primary Examiner—Daniel G. DePumpo
(74) Attorney, Agent, or Firm—Carlson, Gaskey & Olds

(57) ABSTRACT

An automatic axle engagement system utilizes wheel speed sensors, engine control, and braking control to provide optimal engagement of a front drive axle to provide all wheel drive under poor driving conditions. The system includes a transfer case that is coupled to a power source and which has output shafts for front and rear drive axles. The engine provides torque to the transfer case via an input shaft. Wheel sensors generate wheel speed signals that are transmitted to a controller, which determined whether or not there is wheel slip. The controller initiates a shift to drivingly engage the front drive axle if there is wheel slippage by controlling one or both of the output torque or axle braking forces to bring rotational speeds of the input shaft and the rear axle output shaft within a predetermined speed range.

15 Claims, 2 Drawing Sheets

U.S. PATENT DOCUMENTS 6,186,258 B1    2/2001  Deutschel
6,193,006 B1    2/2001  Deutschel
6,360,156 B1 *  3/2002  Morganroth et al. ........ 180/197
6,386,308 B1 *  5/2002  Takahira et al. ............ 180/248

* cited by examiner

AUTOMATIC AXLE TRACTION CONTROL

BACKGROUND OF THE INVENTION

This invention relates to a method and apparatus for controlling engine and brake torque to selectively engage a front drive axle to provide all wheel drive under optimal conditions.

Vehicles utilize all wheel drive systems to achieve improved vehicle control under poor road conditions. All wheel drives for trucks equipped with geared front axle clutched transfer cases are normally engaged and disengaged by a vehicle operator or are engaged full time. Engagement systems can be manually controlled by the operator or can be automatically controlled to engage and disengage the front drive axle. Typically automatic control systems utilize electronic controllers that monitor front and rear axle speeds. When the rotational speed of both the front and rear axles are within a certain range, the controller automatically initiates a shift to engage the front axle.

This automatic controlled engagement and disengagement of the front axle is typically initiated independently from the ground conditions. Thus, engagement of the front axle may not be required or may be poorly timed to maintain vehicle tractive effort. Unnecessary engagement of the front axle results in additional wear of the components, which is undesirable. Further, poorly time shifts can damage transfer case and axle components resulting in vehicle downtime and increased costs for replacement components.

Thus, it is desirable to have an improved control system for axle engagement that takes into account input and output shaft speeds of the transfer case as well as ground conditions to provide optimal axle engagement shifts.

SUMMARY OF THE INVENTION

An all wheel drive system includes a transfer case assembly that is transfers driving torque from a vehicle engine to vehicle drive axles. The transfer case includes an input shaft that receives power source output torque, a rear axle output shaft for transferring driving torque from the transfer case to the rear drive axle, and a front axle output shaft that is selectively engaged to the front drive axle under predetermined conditions to achieve all wheel drive. A controller determines the optimal conditions for the engagement and disengagement of the front axle.

In the preferred embodiment, the controller determines if there is wheel slippage by monitoring the various wheel speeds of the axles. If there is wheel slippage, the controller determines whether or not the input shaft and the rear axle output shaft are both within a predetermined speed range. If the input shaft and the rear axle output shaft are within the predetermined speed range and there is wheel slip, the controller initiates engagement of the front drive axle. If the input shaft and the rear axle output shaft are not within the predetermined speed range, the controller controls the engine output torque and/or wheel brake torque to bring the input shaft and the rear axle output shaft both within the predetermined rotational speed range.

A typical vehicle drive train includes an internal combustion engine or other power source, transmission, transfer case, front drive axle with wheel brakes, and rear drive axle with wheel brakes. The preferred inventive method for coupling the transfer case to the front drive axle during wheel slip to achieve all wheel drive includes the following steps. The input shaft of the transfer case is coupled to the power source that produces an output torque. The rear drive axle is coupled to a rear output shaft of the transfer case. A sensor system measures wheel speed and the controller determines whether or not there is wheel slip. At least one of the output torque or braking torque is controlled to bring the input shaft and the rear output shaft within the predetermined speed range. The front output shaft of the transfer case is coupled to the front drive axle to achieve all wheel drive when the input shaft and the rear output shaft are within the predetermined speed range.

The subject invention provides an improved control system for axle engagement and disengagement that takes into account input and output shaft speeds of the transfer case as well as ground conditions to provide optimal axle engagement shifts. These and other features of the present invention can be best understood from the following specification and drawings, the following of which is a brief description.

DETAILED DESCRIPTION OF A PREFERRED EMBODIMENT

Figure 1:
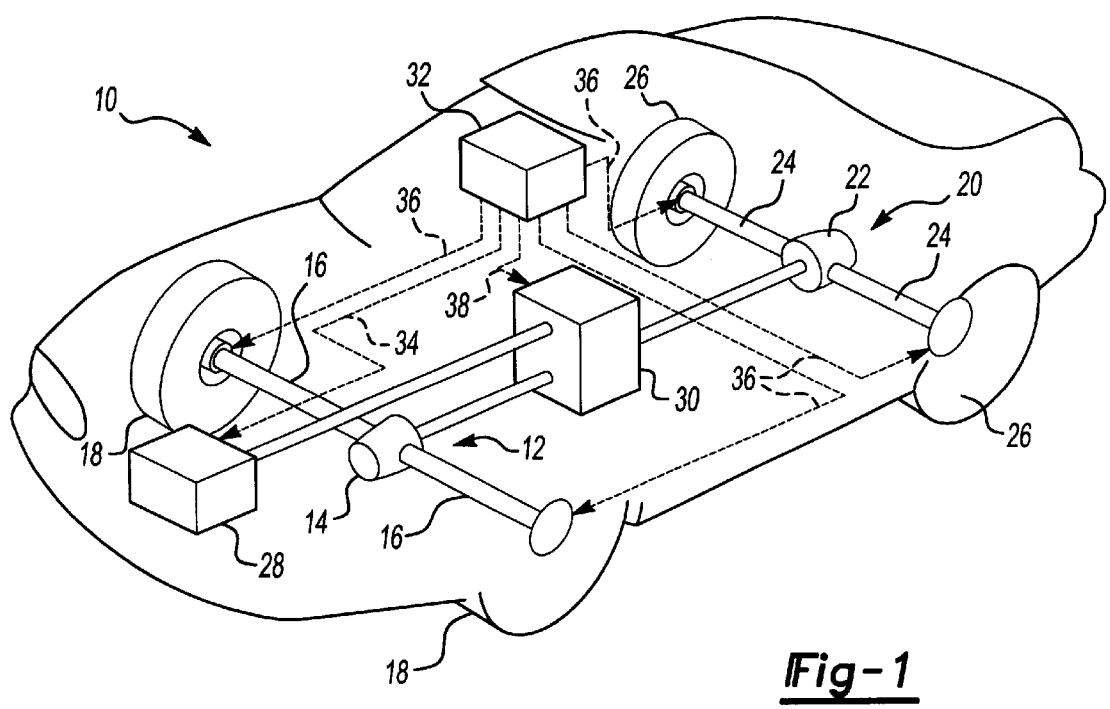
FIG. 1 is a schematic view of a powertrain system incorporating the subject invention.

A typical vehicle powertrain 10 is shown in FIG. 1. The powertrain 10 includes a front drive axle 12 having a center differential 14 for driving a first pair of axle shafts 16, which in turn drive front wheels 18 mounted at opposite ends of the front drive axle 12. The powertrain 10 also includes a rear drive axle 20 with a center differential 22 for driving a second pair of axle shafts 24, which in turn drive rear wheels 26 mounted at opposite ends of the rear drive axle 20.

A power source 28 provides the driving torque to drive the axles 12, 20. A transfer case 30 is used to transfer the driving torque from the power source 28 to the front 12 and rear 20 drive axles. Typically, the rear drive axle 20 is always engaged with the transfer case 30 to provide the vehicle with rear wheel drive. The front drive axle 12 is selectively engagable with the transfer case 30 to provide all wheel drive under predetermined conditions. When ground conditions are poor, such as when there is ice or mud, vehicle control, i.e., tractive effort, is improved when all wheels 18, 26 are provided with driving torque. However, it is undesirable to have all wheel drive when ground conditions are good because all wheel drive adversely affects fuel economy and vehicle maneuverability.

The power source 28 can be any known power source in the art such as an internal combustion engine or electric motor. The power source 28 can also incorporate additional components such as transmissions, power-take-offs, etc.

The subject invention relates to a control system that determines when conditions are optimal to engage and disengage the front drive axle 12. The control system monitors ground conditions and includes a central processor or electronic control unit (ECU) 32 that generates a power source control signal 34 and/or a wheel control signal 36 to provide optimal conditions for axle engagement. The ECU 32 sends a transfer case control signal 38 to initiate shift engagement once the ECU 32 determines that conditions are optimal.

Figure 2:
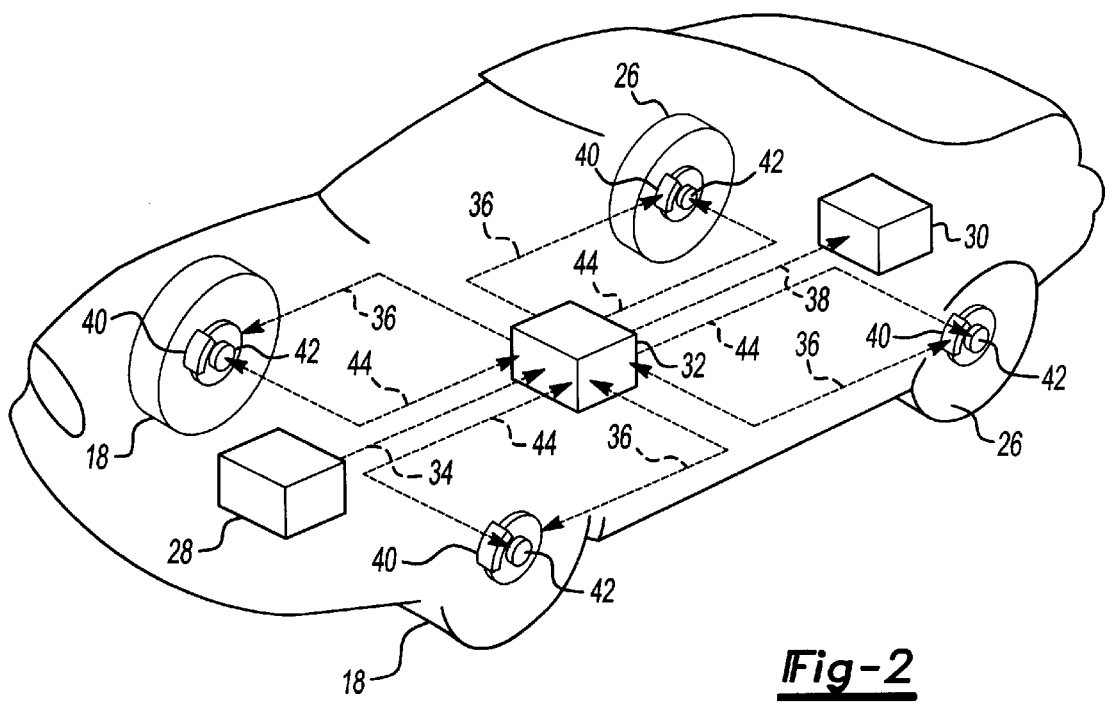
FIG. 2 is a schematic view of a control system for the subject invention.

As shown in FIG. 2, each of the wheels 18, 26 includes a braking mechanism 40 for a brake-by-wire system. Any type of braking mechanism 40 known in the art can be used including dry disc, drum, or wet disc and can be actuated by any known actuation method including hydraulic or pneumatic actuators. Wheel sensors 42 are used to determine wheel speed for each of the wheels 18, 26 and generate wheel speed signals 44 that are transmitted to the ECU 32. By utilizing wheel speed information, the ECU 32 can determine whether or not there is wheel slippage, i.e., poor ground conditions. Once the ECU 32 determines whether or not there is wheel slip the ECU determines whether speed conditions for the transfer case 30 and axles 12, 20 are optimal to initiate a shift. This will be discussed in greater detail below.

Figure 3:
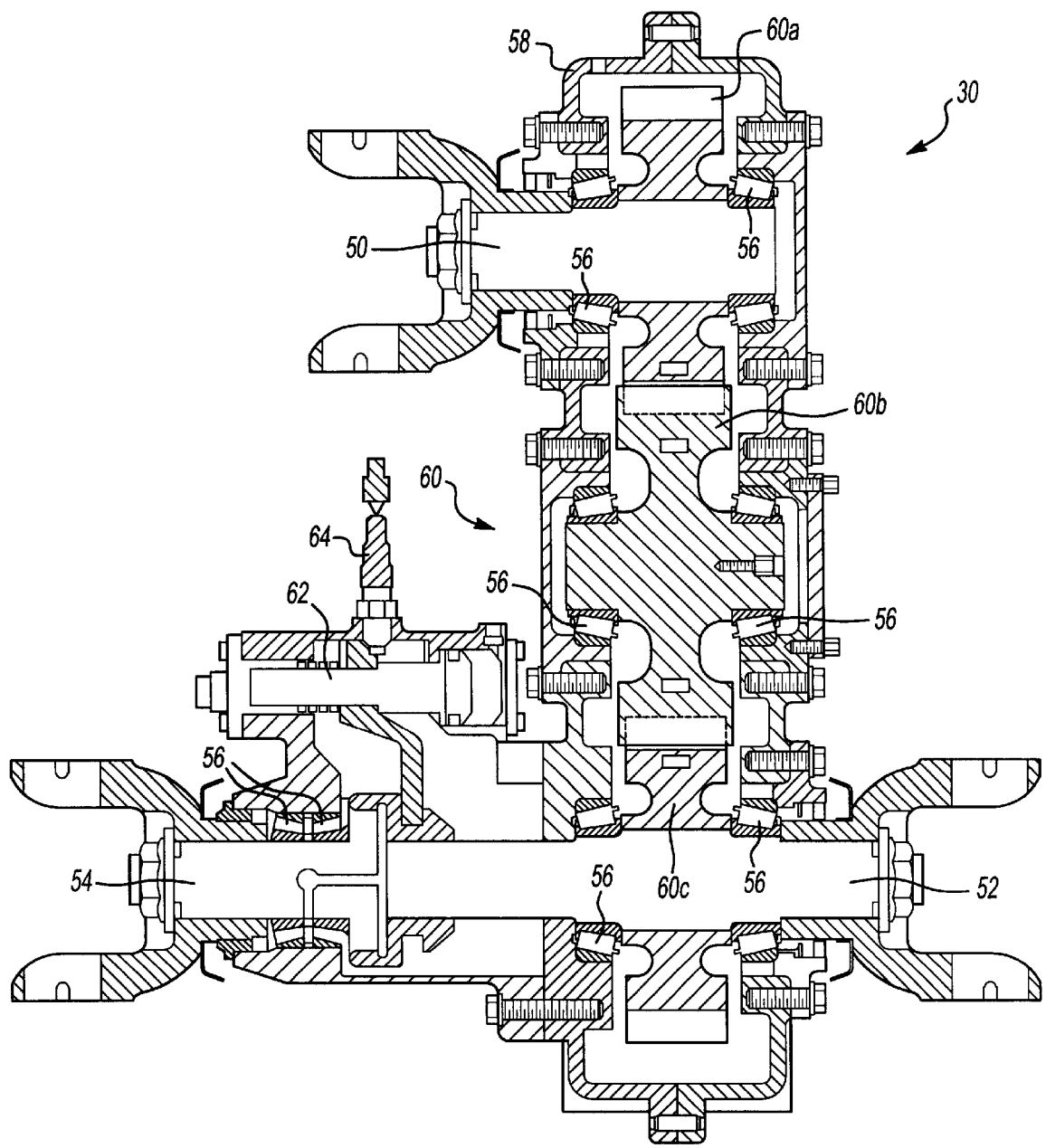
FIG. 3 is a cross-sectional view of a typical transfer case as used with the subject invention.

The transfer case 30 is shown in greater detail in FIG. 3. The transfer case 30 includes an input shaft 50 that couples to the output of the power source 28. The transfer case 30 also includes a rear axle output shaft 52 that is coupled to the rear drive axle 20 and a front axle output shaft 54 that is selectively engaged with the front drive axle 12. The shafts 50, 52, 54 are supported on bearings 56 installed within a housing 58. A gear assembly 60 drivingly connects the input shaft 50 to the rear axle output shaft 52. A first gear 60a is mounted for rotation with the input shaft 50. This first gear meshes with a second gear 60b, which meshes with a third gear 60c mounted for rotation with the rear axle output shaft 52. The gear assembly 60 can provide a 1:1 ratio or can be configured to provide gear reduction if desired.

A declutch mechanism 62 is used to driving engage the front axle output shaft 54 to the rear axle output shaft 52 to engage the front drive axle 12. Any known declutch mechanism can be used. The declutch 62 includes an electrical connector 64 to connect the declutch 62 to the ECU 32.

In order for the ECU 32 to initiate engagement of the front drive axle 12, the input shaft 50 and rear axle output shaft 52 must both be within a predetermined speed range. If both shafts 50, 52 are within the predetermined speed range the ECU 32 signals the declutch 62 to couple the front axle output shaft 54 to the rear axle output shaft 52 such that the shafts 52, 54 rotate together. Thus, when engaged, the front 54 and rear 52 shafts rotate at the same speed. If the shafts 50, 52 are not within the predetermined range, the ECU 32 initiates various control signals to bring the shafts 50, 52 within the predetermined range.

The control system operates in the following manner. First, the ECU 32 determines if there is wheel slippage by monitoring the various wheel speeds of the axles 12, 20. If there is wheel slippage, the ECU 32 determines whether or not the input shaft 50 and the rear axle output shaft 52 are both within the predetermined speed range. If the input shaft 50 and the rear axle output shaft 52 are within the predetermined speed range and there is wheel slip, the ECU 32 initiates engagement of the front drive axle 12.

If the input shaft 50 and the rear axle output shaft 52 are not within the predetermined speed range, the ECU 32 prevents axle engagement until the shafts 50, 52 are within the predetermined range. The ECU 32 controls the shaft speeds by generating a power source control signal 34 to control the output torque and/or generating a braking control signal 36 to control wheel brake torque to bring the input shaft 50 and the rear axle output shaft 52 both within the predetermined rotational speed range. The braking torque and power source output torque can be separately controlled or simultaneously controlled depending upon the ground conditions and wheel speeds. For vehicles that do not have brake-by-wire systems, only output torque is controlled. Alternatively, braking torque control can be solely utilized to bring the shafts 50, 52 within the speed range.

When the ground conditions improve, i.e., there is no longer any wheel slip, the ECU 32 signals 38 the transfer case declutch mechanism 62 to disengage from the front drive axle 12. When the axle is engaged, it may be difficult to determine when ground conditions have improved sufficiently. The transfer case could include a spring disengagement mechanism (not shown) or could operate under a time delay to ensure that disengagement does not occur before the desired traction is achieved.

The subject control system for axle engagement and disengagement that takes into account input and output shaft speeds of the transfer case as well as ground conditions to provide optimal axle engagement shifts. The automated control system determines if there is slippage by sensing wheel speeds. If wheel slip is detected, the ECU 32 uses a defined logic matrix to initiate a controlled shift for front axle engagement. This controlled shift forces the front output shaft 54 and the rear output shaft 52 to be within the predetermined range by interrupting power source output torque along with sequencing a controlled wheel brake signal 36. When the speed range requirement is satisfied, the shift is initiated to engage the front axle. Once the axle is engaged, the power source output torque resumes and the brakes 40 are released.

Engine control technology is currently used to provide optimal transmission shifts. Brake control technology is currently used to provide anti-lock braking systems. The subject invention utilizes benefits from both of these technologies to activate axle engagement drives to provide all wheel drive with shift-on-the fly.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. An automatic axle engagement system comprising:

a power source producing an output torque via a power source output shaft;

a front drive axle having at least first and second wheels selectively driven by said power source under predetermined conditions;

a rear drive axle having at least third and fourth wheels driven by said power source;

a transfer case having an input shaft coupled to said power source output shaft a rear axle output shaft coupled to said rear drive axle, and a front axle output shaft selectively coupled to drive said front drive axle, said rear axle output shaft being driven by said input shaft via a gear assembly;

a sensor assembly for measuring rotational speeds of said first, second, third, and fourth wheels; and an electronic control unit for comparing the rotational speeds of said wheels to determine if there is wheel slippage and for determining whether to initiate a shift to drive said front drive axle wherein said electronic control unit automatically generates a transfer case control signal to couple said front drive axle output shaft to said rear axle output shaft only if there is wheel slippage and if rotational speeds of said input shaft said front and rear axle output shafts are within a predetermined rotational speed range; and wherein said electronic control unit temporarily prohibits coupling of said front axle output shaft to said rear axle output shaft if there is wheel slippage and if said rotational speeds of said front and rear axle output shafts are not within said predetermined rotational speed range with said electronic control unit controlling at least one of a wheel braking force or said output torque to bring said rotational speeds of said input shaft and said front and rear axle output shafts within said predetermined rotational speed range prior to generating said transfer case control signal for coupling said front axle output shaft to said rear axle output shaft.

2. A system according to claim 1 wherein each of said wheels includes a wheel brake controlled by said electronic control unit and wherein said electronic control unit simultaneously controls said output torque and controls said wheel braking force by generating a braking signal to actuate said wheel brakes to bring said input shaft and said front and rear axle output shafts within said predetermined rotational speed range prior to allowing said front axle output shaft to be coupled to said rear axle output shaft.

3. A system according to claim 1 wherein said electronic control unit prevents driving engagement between said front and rear axle output shafts if said input shaft and said front and rear axle output shafts are not within said predetermined speed range and if there is no wheel slippage.

4. A system according to claim 1 wherein said electronic control unit generates a second transfer case control signal to disengage said front axle output shaft from said rear axle output shaft when said electronic control unit determines there is no wheel slippage.

5. An automatic axle engagement system comprising:

a first drive axle continuously driven by a power source;

a second drive axle selectively driven by said power source;

a transfer case including an input shaft operably coupled to said flower source, a first axle output shaft coupled to said input shaft for driving said first drive axle, and a second axle output shaft selectively coupled said first axle output shaft via a clutch mechanism to drive said second drive axle; and a controller for automatically activating said clutch mechanism to couple said first and second axle output shafts together during a wheel slippage condition when rotational speeds of said of said first and second axle output shafts are within a predetermined rotational speed range wherein said controller controls at least one of a power source output torque or a wheel braking force to bring said rotational speeds of said first and second axle output shafts within said predetermined rotational speed range prior to activating said clutch mechanism if said rotational speeds of said first and second axle output shafts are not within said predetermined rotational speed range.

6. A system according to claim 5 wherein said controller only controls said wheel braking force to bring said rotational speeds of said first and second axle output shafts within said predetermined rotational speed range prior to activating said clutch mechanism.

7. A system according to claim 5 wherein said controller only controls said power source output torque to bring said rotational speeds of said first and second axle output shafts within said predetermined rotational speed range prior to activating said clutch mechanism.

8. A system according to claim 5 wherein said controller simultaneously controls both said power source output torque and said wheel braking force to said rotational speeds of said first and second axle output shafts within said predetermined rotational speed range prior to activating said clutch mechanism.

9. A system according to claim 5 wherein said controller activates said clutch mechanism to disengage said second axle output shaft from driving engagement with said input shaft when there is no wheel slippage.

10. A system according to claim 5 wherein said transfer case includes a gear assembly operably coupling said input shaft to said first axle output shaft for continuous driving engagement.

11. A system according to claim 10 wherein said clutch mechanism selectively couples said second axle output shaft for rotation with said first axle output such that said input shaft drives both said first and second axle output shafts via said gear assembly.

12. A system according to claim 11 wherein said first drive axle includes a first differential that receives driving input from said power source and transmits said driving input to a lust set of wheels and said second drive axle includes second differential that selectively receives driving input from said power source and transmits said driving input to a second set of wheels wherein said controller determines rotational speeds of each wheel in said first and second sets of wheels to determine said wheel slippage condition.

13. A system according to claim 12 wherein said controller generates a transfer case control signal to activate said clutch mechanism and couple said first and second axle output shafts together only in response to a determination that wheel slippage is occurring and a determination that said rotational speeds of said first and second axle output shafts are within said predetermined rotational speed range.

14. A system according to claim 13 wherein said controller temporarily prohibits coupling of second axle output shaft to said first axle output shaft if there is wheel slippage and if said rotational speeds of said first and second axle output shafts are not within said predetermined rotational speed range with said controller simultaneously controlling at least one of said wheel braking force or said power source output torque to bring both rotational speeds of said first and: second axle output shafts within said predetermined rotational speed range.

15. A system according to claim 14 wherein said gear assembly includes at least a first gear directly coupled to said input shaft, a second gear directly coupled to said first axle output shaft, and a third gear in meshing engagement with said first and second gears to transfer driving input from said input shaft to said first axle output shaft.

* * * * *

UNITED STATES PATENT AND TRADEMARK OFFICE
CERTIFICATE OF CORRECTION

PATENT NO. : 6,644,428 B2  
DATED : November 11, 2003  
INVENTOR(S) : Gady et al.

It is certified that error appears in the above-identified patent and that said Letters Patent is hereby corrected as shown below:

Column 4,
Line 48, please insert a -- , -- between "shaft" and "a"

Column 5,
Line 35, "flower" should be -- power --

Column 6,
Line 28, "lust" should be -- first --
Line 48, please delete ":" after "and"

Signed and Sealed this

Twenty-fourth Day of February, 2004

JON W. DUDAS
*Acting Director of the United States Patent and Trademark Office*